United States Patent Office 3,238,172
Patented Mar. 1, 1966

3,238,172
INTERNALLY-REINFORCED LATEX AND METHOD FOR MAKING SAME
Leon Talalay and Anselm Talalay, New Haven, Conn., assignors to The B. F. Goodrich Company, New York, N.Y., a corporation of New York
No Drawing. Filed Sept. 12, 1960, Ser. No. 55,197
11 Claims. (Cl. 260—29.7)

This invention relates to an internally-reinforced latex and pertains more particularly to a latex containing polymer particles which are comprised of a heterogeneous mixture of an elastomeric butadiene hydrocarbon polymer and a resinous polymer and to a method for making such a latex.

When compounding "dry" rubber, a reinforcing pigment usually is mixed into the rubber composition in order to increase the hardness, strength and resistance to tear or abrasion of the vulcanizate. The reason why improved properties are obtained when a reinforcing pigment is added to a rubber composition is not fully understood, although it has been observed that to obtain optimum improvement in physical properties the very fine particles of reinforcing pigment must be uniformly dispersed throughout the rubber composition. The addition of the reinforcing pigment to the "dry" rubber is readily accomplished, since the reinforcing pigment can be added with the rubber directly into a Banbury mixer in which the rubber and other compounding ingredients of the composition are intermixed or can be added to the rubber along with the other compounding ingredients of the composition as the rubber is being mixed on a roll mill. With either of these methods of mixing, the reinforcing pigment can be thoroughly dispersed throughout the rubber composition. However, when rubber products are to be made directly from a latex, the mere mixing of a reinforcing pigment into the latex does not provide a reinforcing effect analogous to that obtained when a reinforcing pigment is dispersed uniformly throughout a "dry" rubber composition. The analogous condition does not exist probably because the reinforcing pigment in the latex is not as uniformly dispersed in the polymer after the latex is coagulated as it is when it is mechanically mixed into the "dry" rubber composition. The explanation possibly lies in the fact that in mixing a latex the shear forces encountered are of a much lower order of magnitude than when compounding a "dry" rubber and are incapable of distorting the polymer particles of the latex sufficiently to permit incorporation of the reinforcing pigment into the polymer particles. Indeed, since the stability of a latex depends upon the presence of a colloidal protective layer over the polymer particles of the latex, the exertion of shear forces large enough to penetrate the protective layer and distort the polymer particles would result in the irreversible coagulation of the latex. It is for this reason, apparently, that a strong bond between the reinforcing pigment and polymer in the latex is not attained when a reinforcing pigment merely is mixed into a latex and the latex coagulated. In view of the above discussion, it will be apparent that a convenient and economical method for actually incorporating a resinous polymer reinforcing pigment into elastomeric polymer particles of the latex to provide an internally-reinforced latex would be beneficial.

The present invention provides a latex in which particles of resinous polymer are incorporated into elastomeric butadiene hydrocarbon polymer latex particles, the resinous polymer particles functioning as a reinforcing pigment for the butadiene hydrocarbon polymer. In accordance with the process of this invention, an aqueous dispersion of the resinous polymer is mixed with a butadiene hydrocarbon polymer latex, the latex (with resinous polymer dispersion therein) is frozen to a solid condition at a temperature above temperatures at which coagulation occurs and then is thawed. The freezing and thawing of the latex causes butadiene hydrocarbon polymer particles of the latex to coalesce and form larger particles, as is described in the copending application of Leon Talalay, Serial No. 601,612, filed August 2, 1956, now U.S. Patent No. 3,031,427. As several butadiene hydrocarbon polymer particles coalesce, they trap particles of the resinous reinforcing pigment between them and, as the several butadiene hydrocarbon polymer particles unite into a larger single particle, the particles of resinous reinforcing pigment trapped therebetween are engulfed by the butadiene hydrocarbon polymer and are incorporated in the larger polymer particle formed by the coalescence of the several smaller butadiene hydrocarbon polymer particles.

Emulsion-polymerized aqueous dispersions of butadiene hydrocarbon polymer can be internally reinforced with resinous polymer particles (that is, have resinous polymer particles incorporated into particles of butadiene hydrocarbon polymer) by the process of this invention. The term "butadiene hydrocarbon polymer" as used herein refers to any polymer containing at least 51 percent by weight of a bound butadiene-1,3 hydrocarbon, such as butadiene-1,3 itself or its homologs such as isoprene, 1,4-dimethyl butadiene-1,3; 2,3-dimethyl butadiene-1,3 and the like, and includes homopolymers of butadiene-1,3 hydrocarbons such as polyisoprene and polybutadiene as well as interpolymers of butadiene-1,3 hydrocarbons with one another or with up to 49 percent by weight of one or more other unsaturated monomers copolymerizable therewith such as styrene and substituted styrenes, acrylic and methacrylic acids and their esters and nitriles, vinyl pyridine and other unsaturated vinyl and vinylidene monomers.

Since the process of this invention involves freezing the butadiene hydrocarbon polymer latex (after the dispersion of resinous reinforcing pigment has been added thereto), it is apparent that only latices which can be frozen to a solid condition without coagulating objectionably can be used. Also, it is necessary in accordance with the present invention that the butadiene hydrocarbon polymer particles be surface-unsaturated (that is, the surfaces of the particles of butadiene hydrocarbon polymer in the latex are incompletely covered with emulsifier) at the time the latex is frozen. It is preferable that the butadiene hydrocarbon polymer latex be one that has been polymerized using a fatty acid soap as the emulsifier, preferably a sodium or potassium soap of a fatty acid (either saturated or unsaturated) having from 12 to 18 carbon atoms. The process of this invention is useful for internally-reinforcing latices of any concentration.

The aqueous dispersion of resinous polymer added to the butadiene hydrocarbon polymer latex in accordance with this invention may be any resinous homopolymer latex in which the resinous homopolymer has a refractive index at 20° C. for the sodium D line of less than 1.5900, as determined by A.S.T.M. Procedure No. D–542, or any resinous interpolymer latex. Such resinous polymer latices include polyvinyl chloride latices, polyvinylidene chloride latices, polyvinyl acetate latices, polyvinyl butyral latices, polyacrylonitrile latices, polymethyl methacrylate latices, polyethylacrylate latices, butadiene-styrene copolymer latices in which the butadiene-styrene polymer constituent of the latex contains a predominant amount by weight of bound styrene, butadiene-acrylonitrile copolymer latices in which the butadiene-acrylonitrile polymer constituent of the latex contains a predominant amount by weight of bound acrylonitrile, butadiene-vinylidene chloride copolymer latices in which the butadiene-vinylidene chloride polymer constituent of the latex contains a predominant amount by weight of bound vinylidene chloride, butadiene-methacrylate copolymer latices in which the butadiene-methacrylate polymer constituent of the latex contains a predominant amount by weight of bound methacrylate, butadiene-vinyl pyridine copolymer latices in which the butadiene-vinyl pyridine constituent of the latex contains a predominant amount by weight of bound vinyl pyridine, ethyl acrylate-vinylidene chloride copolymer latices in which the ethyl acrylate-vinylidene chloride polymer constituent of the latex contains a predominant amount by weight of bound vinylidene chloride, and ethyl acrylate-vinyl chloride copolymer latices in which the ethyl acrylatevinyl chloride polymer constituent of the latex contains a predominant amount by weight of bound vinyl chloride. A resinous polymer dispersion for the purpose of this invention is any polymer dispersion in which the polymer constituent has a second order transition temperature above room temperature. The second order transition temperature of a polymer is the temperature at which an abrupt change occurs in the coefficient of cubical or volume expansion of the polymer. The expansion property of polymers is discussed in an article by R. J. Clash, Jr., and L. M. Rynkiewicz appearing in Industrial and Engineering Chemistry, vol. 36, 1944, pages 279–282. Desirably, the resinous polymer has an average particle size of less than 2000 A. Up to 50 or more parts by weight (dry) of the resinous polymer for every 100 parts by weight (dry) of butadiene hydrocarbon polymer can be added in the form of the resinous polymer dispersion to the butadiene hydrocarbon polymer latex. The resinous polymer dispersion can be added to the butadiene hydrocarbon polymer latex in any convenient manner such as by merely blending the butadiene hydrocarbon polymer latex and the resinous polymer dispersion together in a latex blending tank.

Since, as mentioned in the said copending application Serial No. 601,612, now U.S. Patent No. 3,031,427, it is necessary that the surfaces of the butadiene hydrocarbon polymer particles be incompletely covered with emulsifier (that is, that the particles be surface-unsaturated) at the time the latex is frozen in order that several smaller butadiene hydrocarbon polymer particles will coalesce to form larger particles, the total amount of emulsifier in the latex after the addition of the resinous polymer dispersion to the butadiene hydrocarbon polymer latex must not be sufficient to cause complete surface coverage of the butadiene hydrocarbon polymer particles with emulsifier. If the percent surface area covered by emulsifier of the polymer particles in the butadiene hydrocarbon polymer latex is not the same as the percent surface area covered by emulsifier of the polymer particles in the resinous polymer dispersion before the two are intermingled, after blending the butadiene hydrocarbon polymer latex and resinous polymer dispersion together emulsifier will migrate from the polymer particles having the greater percentage of surface area covered with emulsifier to the polymer particles having the lesser percentage surface area covered with emulsifier until the percent surface area covered by emulsifier is the same for all particles in the latex. Since it is only necessary that the particles of butadiene hydrocarbon polymer not be completely covered with emulsifier at the time the latex is frozen, it will be apparent that the butadiene hydrocarbon polymer latex used could be surface-saturated (that is, the butadiene hydrocarbon polymer particles could be completely covered with emulsifier) if the percentage surface area covered with emulsifier of the particles in the resinous polymer dispersion is sufficiently low that upon mixing the butadiene hydrocarbon polymer latex and resinous polymer dispersion together the total emulsifier present after mixing is insufficient to cause complete coverage of the surfaces of the butadiene hydrocarbon polymer particles with emulsifier. Likewise, a surface-saturated resinous polymer dispersion might be used if the percentage surface area of the particles in the butadiene hydrocarbon polymer latex which is covered with emulsifier is sufficiently low that upon mixing the butadiene hydrocarbon polymer latex and resinous polymer dispersion together the total emulsifier present after mixing is insufficient to cause complete coverage of the surfaces of the butadiene hydrocarbon polymer particles with emulsifier. Normally, it is preferred that the total amount of emulsifier in the butadiene hydrocarbon polymer latex after the resinous polymer dispersion has been added thereto not exceed about 5 parts by weight (dry) of emulsifier for every 100 parts by weight (dry) of the butadiene hydrocarbon polymer in the latex at the time of freezing.

The butadiene hydrocarbon polymer latex after the resinous polymer dispersion has been added thereto is frozen to a solid state in any convenient way, although it is preferable that it be frozen as rapidly as possible. The frozen latex need not be retained in a frozen condition for more than a moderate time (1 to 5 seconds being sufficient), since apparently the agglomeration of the butadiene hydrocarbon polymer particles (with the attendant entrapment of the resinous polymer particles in the larger agglomerated particle of butadiene hydrocarbon polymer) takes place either at the time the latex changes from a fluid to the frozen solid phase or at the time the frozen latex changes from the solid to the fluid state upon thawing. The frozen latex then is thawed in any convenient way, but preferably is thawed as rapidly as is practical. Normally, the latex is frozen at from 30 to −50° F., although in some instances it may be desirable to freeze the latex at even lower temperatures. Excellent results have been obtained by freezing the butadiene hydrocarbon polymer latex (after the addition of the resinous polymer dispersion thereto) on the surface of a slowly revolving metal drum which is partly immersed in a reservoir of the latex. As the drum revolves and the peripheral surface of the drum is withdrawn from the reservoir of latex, a layer of the latex adheres to the drum surface. The drum is internally cooled with brine maintained at a sufficiently low temperature that the temperature of the peripheral surface of the drum is below the freezing temperature of the aqueous phase of the latex adhering thereto whereby the thin layer of latex adhering to the peripheral surface of the drum is completely frozen within a very short time (usually within about 2 to 10 seconds). The frozen layer of latex is scraped (by means of a doctor blade) from the surface of the drum into a heated agitator tank in which the frozen latex rapidly is thawed. The thawed latex then is drained from the tank. Upon thawing it is found that, as a result of the freezing and/or thawing operation, smaller butadiene hydrocarbon polymer particles have united to form larger butadiene hydrocarbon polymer particles and in so doing have entrapped resinous polymer particles within the larger particles. It will be appreciated that the agglomerated butadiene hydrocarbon polymer particles internally reinforced with resinous polymer particles comprise a heterogeneous mixture of butadiene hydrocarbon polymer and resinous polymer.

As indicated in the said copending application Serial No. 601,612, now U.S. Patent No. 3,031,427, the conditions at which the latex is frozen and then thawed affect the degree of agglomeration which occurs. The conditions at which the latex is frozen and then thawed also are of importance in the present invention. Although the temperature at which the latex (the butadiene hydrocarbon polymer latex containing resinous polymer dispersion admixed therewith) is frozen may be any temperature at which the latex will freeze to a solid condition which is above temperatures at which coagulation occurs, the latex preferably is frozen at as low a temperature as possible. However, at lower freezing temperatures approaching temperatures at which the latex coagulates an objectionable amount of coagulum may be present in the thawed latex. If the amount of coagulum which may be formed would be objectionable, considering the purpose for which the latex is intended to be used, the amount of coagulum can be reduced or completely eliminated by freezing and/or thawing the latex more rapidly and/or by freezing the latex at a higher temperature. Normally, the latex is frozen at from 30 to −50° F., although in some instances it may be desirable to freeze the latex at even lower temperatures as long as the temperature is not sufficiently low to coagulate the latex. The latex preferably is frozen to a solid condition as rapidly as possible, desirably within 5 minutes and preferably within 1 minute after it is subjected to the temperature at which it is to be frozen.

The pH of the latex (after the resinous polymer dispersion has been admixed therewith) should be considered. Normally, improved results can be obtained if the pH of the latex is reduced before being frozen. However, reducing the pH of the latex has the effect of destabilizing the latex and too great a reduction in pH will cause the latex to coagulate during the freezing and/or thawing operation, particularly if the latex is frozen at a relatively low temperature. If coagulation of the latex does occur, either the pH of the latex and/or the temperature at which the latex is frozen should be raised to overcome this condition.

If too little of the surface area of the particles of polymer in the latex is covered with emulsifier at the time of freezing, the latex will be relatively unstable and cannot be frozen at low temperatures and pH without coagulating. If such a condition exists, the addition of emulsifier to the latex before the latex is frozen generally will improve the stability of the latex. However, it should be remembered that, if the surfaces of the particles of butadiene hydrocarbon polymer are completely covered with emulsifier at the time of freezing, agglomeration of butadiene hydrocarbon polymer particles to form larger particles will not occur. Therefore, if emulsifier is added to the latex to give the latex greater stability, the addition of emulsifier must not be sufficiently great to cause complete coverage of the polymer particles with emulsifier.

The latex after having been frozen to a solid condition should be thawed as rapidly as possible, since it has been found that more coagulum tends to be formed if the latex is thawed slowly than when the latex is more rapidly thawed. The presence of excessive coagulum in the thawed latex is considered objectionable when the latex is intended to be used for certain applications. For example, in the manufacture of foam rubber, the presence of over about 1 percent coagulum usually is considered to be objectionable, although the presence of greater amounts of coagulum in the thawed latex may not be objected to in the manufacture of other products from latex.

The reinforcement of butadiene hydrocarbon polymer particles of a butadiene hydrocarbon polymer latex by the process of this invention is illustrated by the following examples, although it will be understood that the invention is not intended to be limited to these illustrations.

*Example I*

A sample of polyisoprene latex was frozen rapidly by depositing the latex as a thin layer on the surface of a metal drum maintained at about −15° F., the latex being deposited on the surface of the drum by revolving the drum partially immersed in a reservoir of the latex. The frozen latex was pared from the surface of the drum by a doctor blade, was thawed rapidly, and was concentrated by evaporation to a total solids of about 60 percent. The concentrated latex was formed into a foam rubber slab 1 inch thick which exhibited the following physical properties:

Compression index _____ 80.2
Tensile/density of foam rubber _____ 1340
Elongation (percent) _____ 102

To a second sample of the polyisoprene polymer latex was added 15 parts by weight (dry) of a high-styrene butadiene-styrene resin latex (15 butadiene/85 styrene copolymer) per 100 parts by weight (dry) of the polyisoprene polymer latex. The latex sample then was frozen and thawed in the manner described above and was formed into a foam rubber slab 1 inch thick which possessed the following physical properties:

Compression index _____ 111.4
Tensile/density of foam rubber _____ 1460
Elongation (percent) _____ 102

*Example II*

A commercial butadiene-styrene copolymer latex (70 butadiene/30 styrene copolymer, Ameripol 4850 latex) was frozen and thawed as described in Example I and was divided into two samples (Latex Samples 1 and 2). To each latex sample was added 15 parts by weight (dry) of a vinylidene chloride/ethyl acrylate resin latex (95 vinylidene chloride/5 ethyl acrylate copolymer) per 100 parts by weight (dry) of the butadiene-styrene copolymer latex. Latex Sample 2 then was refrozen and thawed in the manner described in Example I. Latex Samples 1 and 2 then were made into foam rubber slabs 1 inch thick (the foam rubber slab formed from Latex Sample 1 being identified as Slab Sample 1 and the foam rubber slab formed from Latex Sample 2 being identified as Slab Sample 2) which exhibited the following physical properties:

|  | Slab Sample 1 | Slab Sample 2 |
| --- | --- | --- |
| Resiliency | 57 | 63 |
| Volume Shrinkage | 16 | 13 |

*Example III*

A butadiene-acrylonitrile copolymer latex (82 butadiene/18 acrylonitrile copolymer) was frozen and thawed as described in Example I and was concentrated by evaporation to a total solids of 63.8%. The thawed latex was divided into two latex samples (Latex Samples 3 and 4). To latex Sample 4 was added 15 parts by weight (dry) of a high-styrene butadiene-styrene resin latex (15 butadiene/85 styrene copolymer) per 100 parts by weight (dry) of the sample. Latex Sample 4 then was refrozen and thawed in the manner described in Example I. Foam rubber slabs 4 inches thick were made from each of the latex samples (Slab Sample 3 from Latex Sample 3 and Slab Sample 4 from Latex Sample 4). The foam rubber slabs exhibited the following physical properties:

|  | Slab Sample 3 | Slab Sample 4 |
| --- | --- | --- |
| Compression Index | 207 | 394 |
| Tensile/density | 1,390 | 2,140 |
| Elongation | 153 | 143 |
| Volume Shrinkage | 20 | 17 |

*Example IV*

A commercial butadiene-styrene copolymer latex (70 butadiene/30 styrene copolymer, Ameripol 4850 latex) was frozen and thawed and described in Example I and was concentrated by evaporating to about 68% total solids. The latex sample was divided into five parts (Latex Samples 5, 6, 7, 8 and 9). To Latex Sample 6 was added 15 parts by weight (dry) of a high-styrene butadiene-styrene resin dispersion (10 butadiene/90 styrene copolymer) per 100 parts by weight (dry) of the sample. To Latex Sample 7 was added 15 parts by weight (dry) of a high-styrene butadiene-styrene resin dispersion (20 butadiene/80 styrene copolymer) per 100 parts by weight (dry) of the sample. To Latex Sample 8 was added 15 parts by weight (dry) of a high-styrene butadiene-styrene resin dispersion (30 butadiene/70 styrene copolymer) per 100 parts by weight (dry) of the sample. To Latex Sample 9 was added 15 parts by weight (dry) of a high-styrene butadiene-styrene dispersion (40 butadiene/60 styrene copolymer) per 100 parts by weight (dry) of the sample. Latex Samples 6 through 9 then were refrozen and thawed in the manner described in Example I. Foam rubber slabs one inch thick were made from each of the latex samples (Slab Sample 5 from Latex Sample 5, Slab Sample 6 from Latex Sample 6, Slab Sample 7 from Latex Sample 7, Slab Sample 8 from Latex Sample 8 and Slab Sample 9 from Latex Sample 9). The foam rubber slabs had the following physical properties:

| Property | Slab Sample | | | | |
|---|---|---|---|---|---|
| | 5 | 6 | 7 | 8 | 9 |
| Compressive Index | 100 | 170 | 140 | 120 | 100 |
| Tensile/density | 1,400 | 2,200 | 2,400 | 1,850 | 1,500 |
| Elongation (percent) | 120 | 99 | 110 | 124 | 128 |
| Percent Hot Set | 4 | 12 | 6 | 6 | 9 |

*Example V*

A commercial high-solids butadiene-styrene copolymer latex (a 70 butadiene/30 styrene copolymer latex) was divided into seven latex samples (Latex Samples 10, 11, 12, 13, 14, 15 and 16). To Latex Samples 11 and 12 was added 10 parts by weight (dry) of a high-styrene butadiene-styrene resin dispersion (15 butadiene/85 styrene copolymer) for every 100 parts by weight (dry) of the sample. To Latex Samples 13 and 14 was added 20 parts by weight (dry) of the high-styrene butadiene-styrene resin dispersion and 1 part by weight (dry) of potassium oleate (emulsifier) for every 100 parts by weight (dry) of the latex sample. To Latex Samples 15 and 16 was added 30 parts by weight (dry) of the high-styrene butadiene-styrene resin dispersion and 2 parts by weight (dry) of potassium oleate for every 100 parts by weight (dry) of the latex sample. Latex Samples 12, 14, and 16 then were refrozen and thawed in the manner described in Example I. Foam rubber slabs 1 inch thick were made from each of the latex samples (Slab Sample 10 from Latex Sample 10, Slab Sample 11 from Latex Sample 11, Slab Sample 12 from Latex Sample 12, Slab Sample 13 from Latex Sample 13, Slab Sample 14 from Latex Sample 14, Slab Sample 15 from Latex Sample 15 and Slab Sample 16 from Latex Sample 16). The foam rubber slabs had the following physical properties:

| Slab | Elongation (percent) | Hot Set 158° F. (percent) |
|---|---|---|
| Slab Sample 10 | 173 | 7 |
| Slab Sample 11 | 144 | 10 |
| Slab Sample 12 | 121 | 8 |
| Slab Sample 13 | 120 | 15 |
| Slab Sample 14 | 112 | 10 |
| Slab Sample 15 | 116 | 15 |
| Slab Sample 16 | 101 | 6 |

It is seen that at each level of reinforcing resinous pigment used there was less hot set in the foam pads made from the frozen latex samples than in the foam pads made from latex samples which had been merely mixed with the resin dispersion. This, as well as the elongation data, evidences that better incorporation of the resin polymer particles into the butadiene hydrocarbon polymer particles of butadiene hydrocarbon latex had occurred as a consequence of freezing.

*Example VI*

A foam rubber slab (Slab Sample 17) 1 inch thick was formed from a sample (Latex Sample 17) of a commercial butadiene-styrene copolymer latex (70 butadiene/30 styrene copolymer, Pliolite 5352). To a second sample (Latex Sample 18) of the Pliolite 5352 butadiene-styrene copolymer latex was added 15 parts by weight (dry) of a high-styrene butadiene-styrene resin latex (15 butadiene/85 styrene copolymer) per 100 parts by weight (dry) of the sample. Latex Sample 18 was frozen and thawed as described in Example I and a 1 inch thick foam rubber slab (Slab Sample 18) was made therefrom. Slab Samples 17 and 18 showed the following physical properties:

| | Slab Sample 17 | Slab Sample 18 |
|---|---|---|
| Compression Index | 125 | 396 |
| Tensile/density of foam rubber | 2,050 | 3,020 |
| Elongation | 140 | 117 |

*Example VII*

A sample of commercial butadiene-styrene copolymer latex (70 butadiene/30 styrene copolymer, SBR 2105 latex) was divided into 3 portions which were identified as Latex Samples 19, 20 and 21. Latex Sample 20 was frozen and thawed as described in Example I. To Latex Sample 21 was added 15 parts by weight (dry) of a high-styrene butadiene-styrene resin latex (15 butadiene/85 styrene copolymer) per 100 parts by weight (dry) of the sample. Latex Sample 21 then was frozen and thawed as described in Example I. Foam rubber slabs were made from Latex Samples 19, 20 and 21 and were identified as foam rubber Slab Samples 19, 20 and 21, respectively. The foam rubber slabs had the following physical properties:

| Property | Slab Sample 19 | Slab Sample 20 | Slab Sample 21 |
|---|---|---|---|
| Compression Index | 90 | 108 | 227 |
| Tensile/density of foam rubber | 1,880 | 2,430 | 4,630 |
| Elongation | 173 | 169 | 162 |

*Example VIII*

A foam rubber slab (Slab Sample 22) 1 inch thick was formed from a sample (Latex Sample 22) of a commercial 70 butadiene/30 styrene copolymer latex. To a second sample (Latex Sample 23) of the butadiene-styrene copolymer latex was added 15 parts by weight (dry) of a 75 styrene/25 acrylonitrile copolymer resin per 100 parts by weight (dry) of the sample. Latex Samples 22 and 23 were frozen and thawed as described in Example I and were concentrated by evaporation to a solids content of about 60%. Foam rubber slab samples 1 inch thick were made from the latex samples (Slab Sample 22 from Latex Sample 22 and Slab Sample 23 from Latex Sample 23). They exhibited the following physical properties:

| Property | Latex Slab 22 | Latex Slab 23 |
|---|---|---|
| Compression Index | 100 | 185 |
| Tensile/density of foam rubber | 1,400 | 1,600 |
| Volume Shrinkage | 15.5 | 7.1 |

The internally-reinforced latex formed by the process of this invention is useful for any application for which latices heretofore have been used, such as in the manufacture of foam rubber, dipped rubber articles and cast rubber articles.

It will be clear that obvious variations and modifications of this invention may be made without departing from the spirit and scope of this invention as defined in the appended claims.

We claim:

1. A method for internally reinforcing butadiene hydrocarbon polymer particles of an emulsion-polymerized butadiene hydrocarbon polymer synthetic latex in which the polymer constituent contains at least 51 percent by weight of a bound butadiene-1,3 hydrocarbon which comprises mixing an aqueous dispersion of a resinous polymer selected from the group consisting of resinous homopolymers having a refractive index at 20° C. for the sodium D line of less than 1.5900 as determined by A.S.T.M. Procedure No. D-542 and having a second order transition temperature above room temperature and resinous interpolymers having a second order transition temperature above room temperature with the said butadiene hydrocarbon polymer latex, the emulsifier present in the resulting mixture of butadiene hydrocarbon polymer latex and resinous polymer dispersion being insufficient to completely cover the surface area of the polymer particles of the mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

2. A method for internally reinforcing butadiene hydrocarbon polymer particles of an emulsion-polymerized butadiene hydrocarbon polymer synthetic latex in which the polymer constituent contains at least 51 percent by weight of a bound butadiene-1,3 hydrocarbon which comprises mixing an aqueous dispersion of a resinous polymer selected from the group consisting of resinous homopolymers having a refractive index at 20° C. of less than 1.5900 as determined by A.S.T.M. Procedure No. D-542 and having a second order transition temperature above room temperature and resinous interpolymers having a second order transition temperature above room temperature with the said butadiene hydrocarbon polymer latex, the emulsifier present in the resulting mixture of butadiene hydrocarbon polymer latex and resinous polymer dispersion being insufficient to completely cover the surface area of the polymer particles of the mixture, freezing said mixture of butadiene hydrocarbon polymer latex and resinous polymer dispersion to a solid mass at a temperature between 30° to −50° F. and at a temperature above temperatures at which the said mixture coagulates, and reconstituting a fluid latex from the frozen mass by completely thawing the frozen mass.

3. A method of internally reinforcing butadiene hydrocarbon polymer particles of an emulsion-polymerized butadiene hydrocarbon polymer synthetic latex in which the polymer constituent contains at least 51 percent by weight of a bound butadiene-1,3-hydrocarbon which comprises mixing an aqueous dispersion of a resinous polymer selected from the group consisting of resinous homopolymers having a refractive index at 20° C. of less than 1.5900 as determined by A.S.T.M. Procedure No. D-542 and having a second order transition temperature above room temperature and resinous interpolymers having a second order transition temperature above room temperature with the said butadiene hydrocarbon polymer latex, the emulsifier present in the resulting mixture of butadiene hydrocarbon polymer latex and resinous polymer dispersion being insufficient to completely cover the surface area of the polymer particles of the mixture, freezing said mixture of butadiene hydrocarbon polymer latex and resinous polymer dispersion to a solid mass at a temperature between 30° to −50° F. and to a temperature above temperatures at which the said mixture coagulates and within five minutes after the said mixture is subjected to the freeze temperature, and reconstituting a fluid latex from the frozen mass by completely thawing the frozen mass.

4. A method for internally reinforcing butadiene hydrocarbon polymer particles of an emulsion-polymerized butadiene hydrocarbon polymer synthetic latex in which the polymer constituent contains at least 51 percent by weight of a bound butadiene-1,3 hydrocarbon which comprises mixing an aqueous dispersion of a resinous polymer selected from the group consisting of resinous homopolymers having a refractive index at 20° C. of less than 1.5900 as determined by A.S.T.M Procedure No. D-542 and having a second order transition temperature above room temperature and resinous interpolymers having a second order transition temperature above room temperature with the said butadiene hydrocarbon polymer latex, the emulsifier present in the resulting mixture of butadiene hydrocarbon polymer latex and resinous polymer dispersion being insufficient to completely cover the surface area of the polymer particles of the mixture, reducing the pH of the said mixture to a pH value above pH values sufficient to cause coagulation of the said mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

5. A method for internally reinforcing butadiene hydrocarbon polymer particles of an emulsion-polymerized butadiene hydrocarbon polymer synthetic latex in which the polymer constituent contains at least 51% by weight of a bound butadiene-1,3 hydrocarbon which comprises mixing an aqueous dispersion of a resinous polymer having an average particle size of less than 2000 A. with said emulsion-polymerized butadiene hydrocarbon polymer synthetic latex, said resinous polymer being selected from the group consisting of resinous homopolymers having a refractive index at 20° C. for the sodium D line of less than 1.5900 as determined by A.S.T.M. Procedure No. D-542 and having a second order transition temperature above room temperature and resinous interpolymers having a second order transition temperature above room temperature, the emulsifier present in the resulting mixture of butadiene hydrocarbon polymer latex and resinous polymer dispersion being insufficient to completely cover the surface area of the polymer particles of the mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

6. A method for internally reinforcing butadiene hydrocarbon polymer particles of an emulsion-polymerized butadiene hydrocarbon polymer synthetic latex in which the polymer constituent contains at least 51 percent by weight of a bound butadiene-1,3 hydrocarbon which comprises mixing an aqueous dispersion of a resinous homopolymer having a refractive index at 20° C. for the sodium D line of less than 1.5900 as determined by A.S.T.M. Procedure No. D-542 and having a second order transition temperature above room temperature with the said butadiene hydrocarbon polymer latex, the emulsifier present in the resulting mixture of butadiene hydrocarbon polymer latex and resinous polymer dispersion being insufficient to completely cover the surface area of the polymer particles of the mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

7. A method for internally reinforcing butadiene hydrocarbon polymer particles of an emulsion-polymerized butadiene hydrocarbon polymer synthetic latex in which the polymer constituent contains at least 51 percent by weight of a bound butadiene-1,3 hydrocarbon which comprises mixing an aqueous dispersion of a resinous interpolymer having a second order transition temperature above room temperature with the said butadiene hydrocarbon polymer latex, the emulsifier present in the resulting mixture of butadiene hydrocarbon polymer latex and resinous polymer dispersion being insufficient to completely cover the surface area of the polymer particles of the mixture, freezing said mixture of butadiene hydrocarbon polymer latex and resinous polymer dispersion to a solid mass at a temperature above temperatures at which the said mixture coagulates, and reconstituting a fluid latex from the frozen mass by completely thawing the frozen mass.

8. A latex containing dispersed individual particles which comprise agglomerated butadiene hydrocarbon polymer having entrapped therein individual particles of resinous polymer selected from the group consisting of (1) resinous homopolymers having a refractive index at 20° C. for the sodium D line of less than 1.5900 as determined by A.S.T.M. Procedure No. D-542 and having a second order transition temperature above room temperature and (2) resinous interpolymers having a second order transition temperature above room temperature which agglomerated particles are formed by the coalescence of dispersed butadiene hydrocarbon polymer particles and the entrapment of individual particles of said resinous polymer by the coalescing butadiene hydrocarbon polymer particles as they coalesce to form new larger dispersed butadiene hydrocarbon polymer particles, said agglomerated butadiene hydrocarbon polymer containing at least 51 percent by weight of a bound butadiene-1,3 hydrocarbon.

9. A latex containing dispersed individual particles which comprise agglomerated butadiene hydrocarbon polymer having entrapped therein individual particles of resinous polymer selected from the group consisting of (1) resinous homopolymers having a refractive index at 20° C. for the sodium D line of less than 1.5900 as determined by A.S.T.M. Procedure No. D-542 and having a second order transition temperature above room temperature and (2) resinous interpolymers having a second order transition temperature above room temperature which agglomerated particles are formed by the coalescence of dispersed butadiene hydrocarbon polymer particles and the entrapment of individual particles of said resinous polymer by the coalescing butadiene hydrocarbon particles as they coalesce to form new larger dispersed butadiene hydrocarbon polymer particles, said agglomerated butadiene hydrocarbon polymer containing at least 51 percent by weight of a bound butadiene-1,3 hydrocarbon, said particles of resinous polymer having an average particle size of less than 2000 A.

10. A latex containing dispersed individual particles which comprise agglomerated butadiene hydrocarbon polymer having entrapped therein individual particles of resinous homoploymer having a refractive index at 20° C. for the sodium D line of less than 1.5900 as determined by A.S.T.M. Procedure No. D-542 and having a second order transition temperature above room temperature which agglomerated particles are formed by the coalescence of dispersed butadiene hydrocarbon polymer particles and the entrapment of individual particles of said resinous homopolymer by the coalescing butadiene hydrocarbon particles as they coalesce to form new larger dispersed butadiene hydrocarbon polymer particles, said agglomerated butadiene hydrocarbon polymer containing at least 51 percent by weight of a bound butadiene-1,3 hydrocarbon.

11. A latex containing dispersed individual particles which comprise agglomerated butadiene hydrocarbon polymer having entrapped therein individual particles of resinous interpolymer having a second order transition temperature above room temperature which agglomerated particles are formed by the coalescence of dispersed butadiene hydrocarbon polymer particles and the entrapment of individual particles of said resinous interpolymer by the coalescing butadiene hydrocarbon particles as they coalesce to form new larger dispersed butadiene hydrocarbon polymer particles, said agglomerated butadiene hydrocarbon containing at least 51 percent by weight of a bound butadiene-1,3 hydrocarbon.

References Cited by the Examiner

UNITED STATES PATENTS

| | | | |
|---|---|---|---|
| 2,538,779 | 1/1951 | Harrison et al. | 260—887 |
| 2,614,093 | 10/1952 | Wheelock | 260—29.7 |
| 3,031,427 | 4/1962 | Talalay | 260—29.7 |

FOREIGN PATENTS

| | | |
|---|---|---|
| 758,622 | 10/1956 | Great Britain. |
| 841,758 | 7/1960 | Great Britain. |

MURRAY TILLMAN, *Primary Examiner.*

DANIEL ARNOLD, LEON J. BERCOVITZ, WILLIAM H. SHORT, EUGENE B. WOODRUFF, JACOB ZIEGLER, *Assistant Examiners.*